(12) United States Patent
Jansen

(10) Patent No.: US 7,240,695 B2
(45) Date of Patent: Jul. 10, 2007

(54) MULTI-CHANNEL PINTLE VALVE

(75) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 512 days.

(21) Appl. No.: 10/366,293

(22) Filed: Feb. 13, 2003

(65) Prior Publication Data

US 2003/0168115 A1 Sep. 11, 2003

Related U.S. Application Data

(60) Provisional application No. 60/357,152, filed on Feb. 14, 2002.

(51) Int. Cl.
*F16K 11/10* (2006.01)

(52) U.S. Cl. .................... 137/637.1; 251/84

(58) Field of Classification Search .......... 137/625.48, 137/637.1, 630.17, 630.18, 867, 870; 251/84, 251/122, 124, 266, 267, 273

See application file for complete search history.

(56) References Cited

U.S. PATENT DOCUMENTS

| 215,478 | A | | 5/1879 | Pottle | |
|---|---|---|---|---|---|
| 1,538,207 | A | * | 5/1925 | Niedecken | 251/85 |
| 1,721,954 | A | * | 7/1929 | Herst | 137/630.17 |
| 2,959,541 | A | * | 11/1960 | Cleary | 210/670 |
| 3,430,654 | A | | 3/1969 | Mills | |
| 4,211,258 | A | * | 7/1980 | Switall | 137/862 |
| 4,948,091 | A | * | 8/1990 | Satoh et al. | 251/65 |
| 6,016,832 | A | * | 1/2000 | Vars et al. | 137/487.5 |
| 6,250,602 | B1 | | 6/2001 | Jansen | |

* cited by examiner

*Primary Examiner*—John Fox
(74) *Attorney, Agent, or Firm*—Quarles & Brady LLP

(57) ABSTRACT

A multi-channel valve uses a single drive motor to translate a single actuator assembly coupling multiple pintle valves for metering the same amount of media through each channel. The actuator assembly includes a swivel base mounting two or more clevis and nut arrangements coupled to the pintles. The actuator assembly translates the pintles the same distance. The clevis and nut joints can pivot and slide with respect to the swivel base to provide four degrees of freedom between the pintles to significantly reduce binding or side loading on one or both pintles. A stop cushioning assembly is provided to prevent jamming at the interface of the actuator assembly and a motor driven drive assembly.

37 Claims, 4 Drawing Sheets

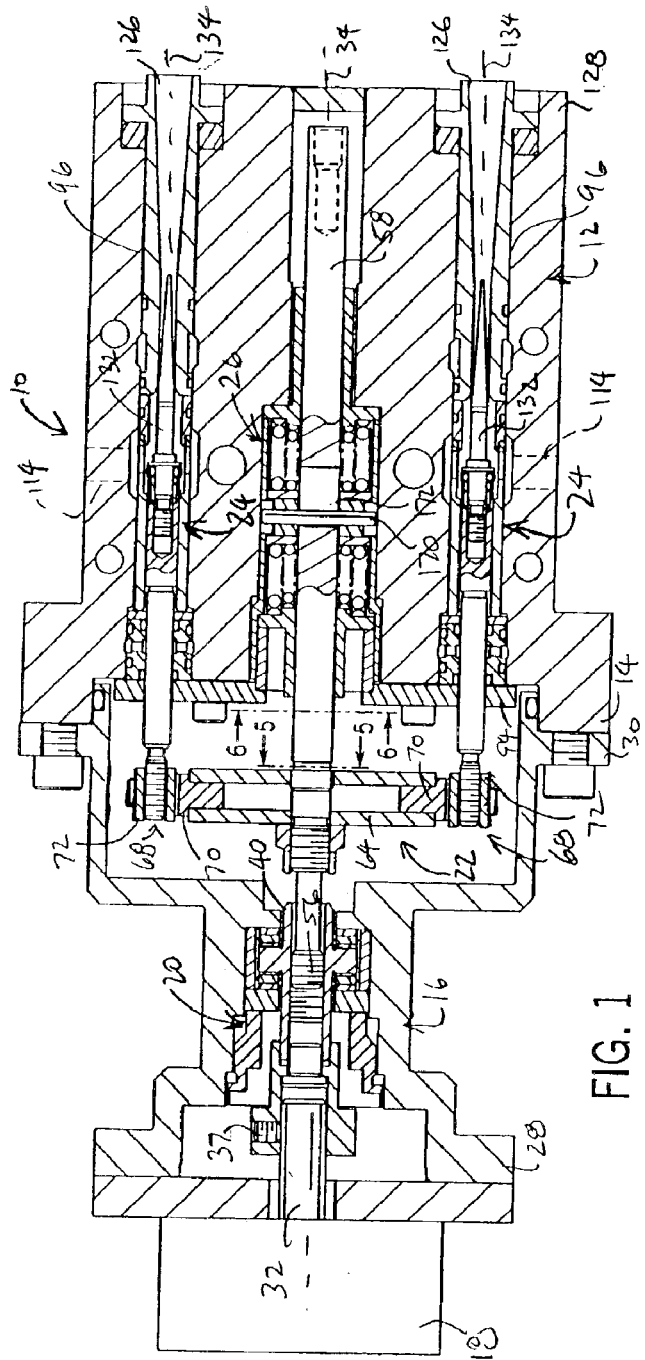
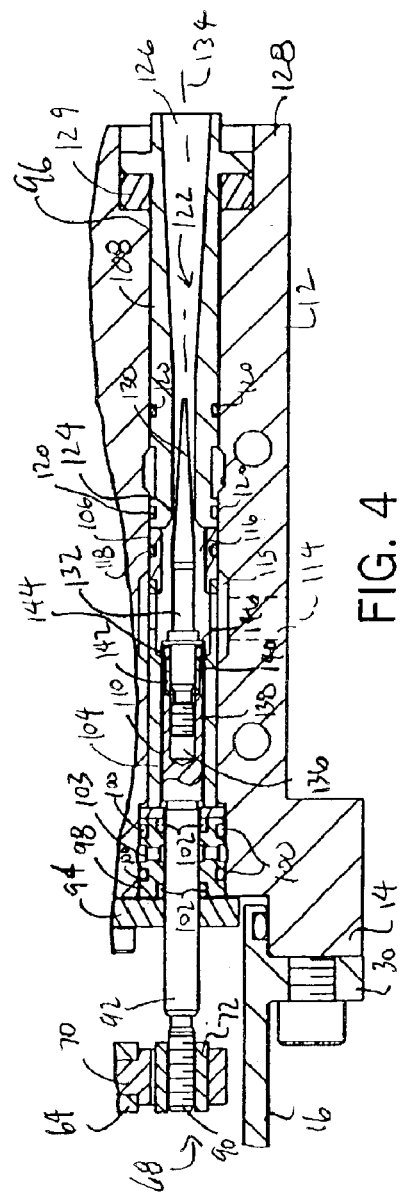
FIG. 1
FIG. 4

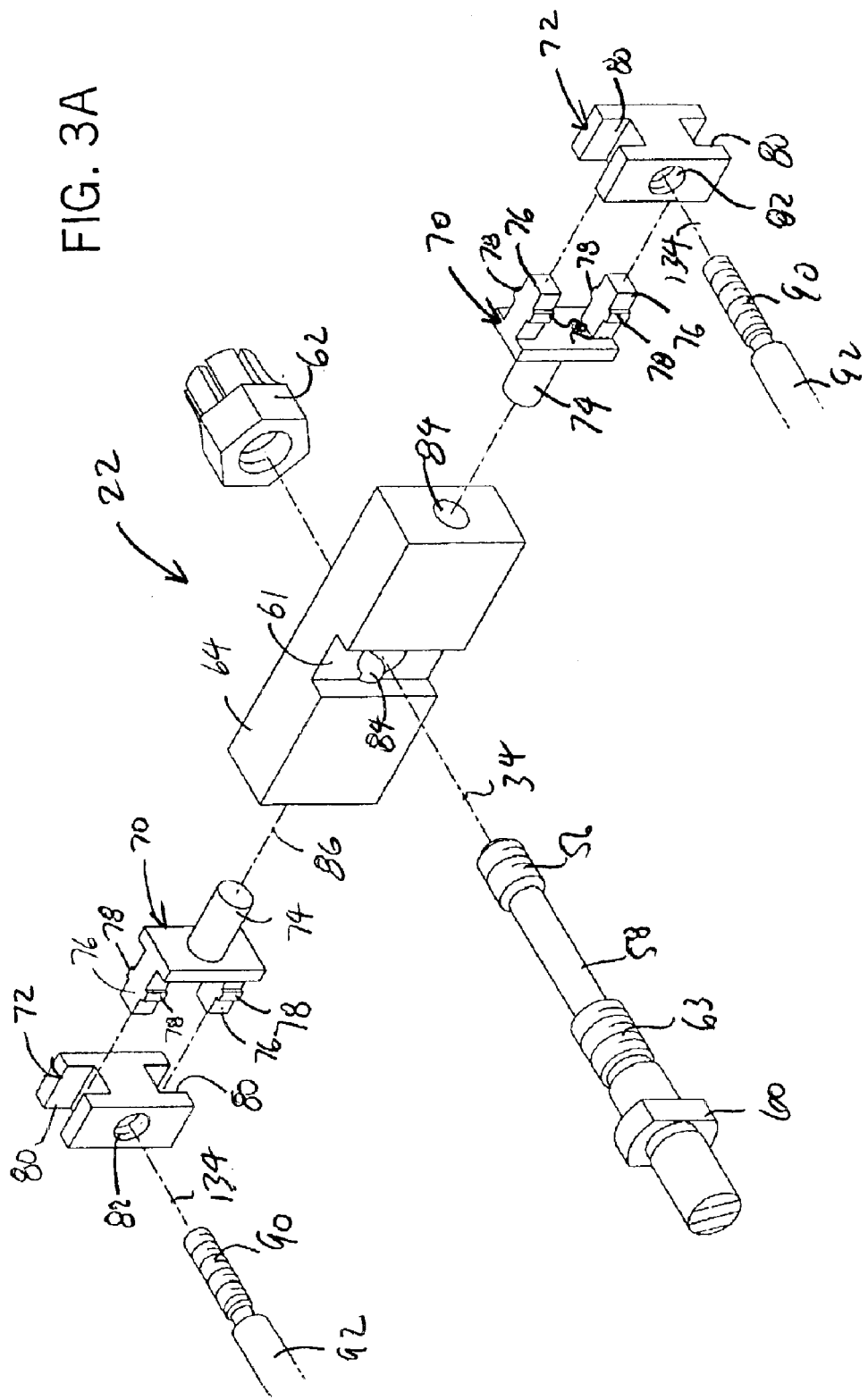

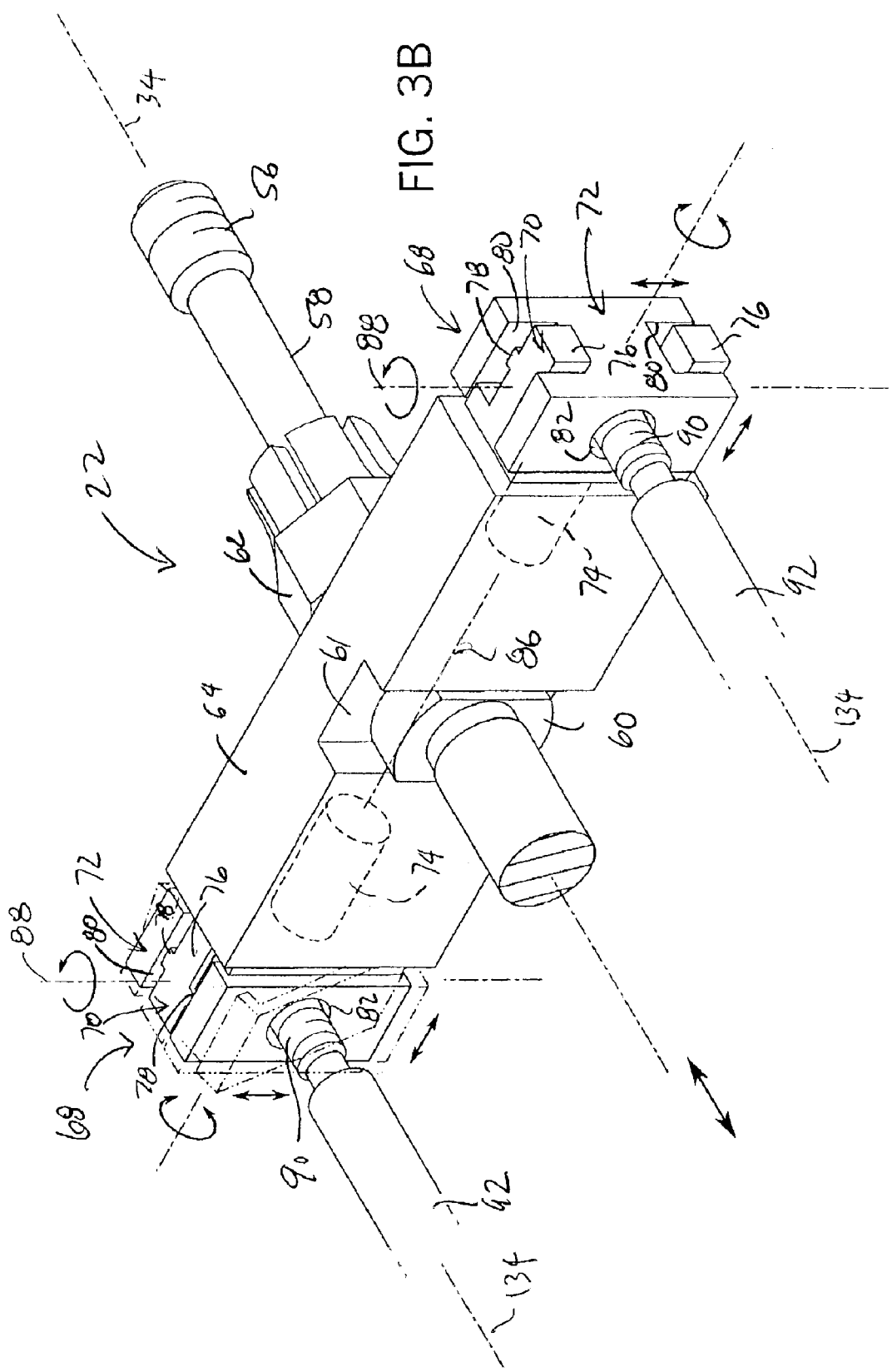

MULTI-CHANNEL PINTLE VALVE

CROSS-REFERENCE TO RELATED APPLICATION

This application claims benefit to U.S. provisional application Ser. No. 60/357,152 filed Feb. 14, 2002.

STATEMENT OF FEDERALLY SPONSORED RESEARCH OR DEVELOPMENT

Not applicable.

BACKGROUND OF THE INVENTION

1. Technical Field

The present invention relates to metering valves, and in particular, to pintle valves, such as can be used to meter liquid or gaseous fuel in air and space vehicles.

2. Description of the Related Art

Valves for metering fuel and other combustible media to engines in aircraft and spacecraft are well known in the art, see eg., U.S. Pat. No. 6,250,602, assigned to the assignee of the present invention and hereby incorporated by reference as though fully set forth herein. Such valves are used to control the rate at which pressurized fuel, in a liquid or gaseous state, is supplied to inlet orifices in the engine combustion chambers. The valves are relied upon to provide consistent and rapid control of flow rates of fuel at ignition and during sustained operation. Their operation is critical to proper performance of the vehicle. Poor valve operation can result in unstable engine performance and possible failure.

These valves can have movable stem-like valve members, or pintles, aligned with the outlet port of the valve for controlling the rate at which fuel flows to the engine. Pintle type valves are typically less affected by the temperatures and pressures of the fuel passing through the fuel chamber of the valve, due to their contoured head and axial movement parallel to the media.

The pintles are moved between extended and retracted positions by a drive/actuator system, which can be can be a electric, mechanical, hydraulic, pneumatic or combinations thereof. Typical pintle metering valves, such as in the '602 patent, require a separate actuator system for each pintle valves. Thus, in applications requiring metering of multiple flow channels, separate actuators must be used. The numerous actuators add cost, size and weight to the metering system. In some applications, such as air and space vehicles, for example vehicles with supersonic combustion ramjet ("scramjet") engines, space and weight must be minimized as much as possible, thus making conventional valves undesirable.

Another problem with separate valves or valve channels is flow division deviation, which occurs when the flow through each valve in a multi-valve system is not identical. Slight deviations between the flow volumes or rates of the valves can significantly adversely impact performance in certain applications. For example, it is critical to minimize flow deviation between the valves metering fuel to the multiple zones of the combustion chamber in a scramjet engine.

SUMMARY OF THE INVENTION

The present invention provides an improved metering valve particularly designed to consolidate actuation of multiple separate or multi-channel valves.

Specifically, the invention provides a multi-channel metering valve having a housing defining two valve channels with corresponding outlet ports. Two valve members are disposed in the two valve channels and are movable along stroke axes to open and close off communication to the respective the outlet ports. An actuator assembly has two movable joints coupled to the valve members and is moved by a drive assembly to translate the valve members along their associated second stroke axis.

In one preferred form, the valve members are pintles having a contoured head. The heads of the pintles are shaped and sized to seat against and close off a through of a venturi passageway upstream from the outlet ports. The venturi passageway provides sonic velocity flow through the throat to reduce noise without high pressure losses in the nozzle.

In another preferred form, each movable joint includes a clevis and nut arrangement that can pivot about and slide along a clevis axis essentially coplanar with and perpendicular to the stroke axes. Preferably, the actuator assembly includes a swivel base valve member supporting structure to which the clevis and nut arrangements are movable connected. A stem of each clevis fits into an associated opening in the swivel base along a peripheral edge defining at least two opposite facing surfaces parallel to the stroke axes. An opposite forked end of the clevis mounts the nuts at tapered ears, which allow the nut to pivot and translate slightly with respect to the clevis. Preferably, this arrangement provides four degrees of freedom between each valve and the drive assembly, namely translation and rotation of each clevis with respect to the swivel base and translation and rotation (although to a lesser degree) of each nut with respect to its associated clevis. Each nut has a threaded bore for coupling to the valve member directly or to an intermediate drive rod.

The quantity of valve members and movable joints can be more than two depending on the number of channels in the valve. The principle of operation is the same regardless of the number of channels, albeit the valve member supporting structure (swivel base) will likely vary in size and shape depending on the number of channels in the valve. For example, a two channel valve may have a straight bar swivel base, a four channel valve may have a cross or square block shaped swivel base and a five or more channel base may have a disc shaped swivel base.

In yet another preferred form, the valve includes an anti-rotated shaft driven by the drive assembly to translate the actuator assembly essentially parallel to the stroke axes. Preferably, the shaft extends through a central opening in the swivel base to which it is fixedly secured. The shaft preferably has a slot receiving an anti-rotation pin. A drive motor turns a drive nut engaging a threaded end of the shaft to impart translation to the actuator assembly and the valve members.

In still another preferred form, the valve includes a stop cushioning assembly providing non-jamming stops that may otherwise occur in the event the motor overdrives the actuator assembly. The cushioning assembly preferably includes two cups each containing two preloaded springs mounted about the shaft on each side of the anti-rotation pin allowing translation of the pin parallel to the stroke axes.

The present invention thus provides a highly accurate metering valve using a single motor and actuator to drive the valve members controlling flow through the multiple channels of the valves. The actuator assembly drives the valve members nearly identical distances to meter nearly identical volumes of media through all channels with little or no play in the primary direction of translation (along the stroke axes). Flow division deviation is further minimized by the movable clevis and nut joints for each valve member providing restrained movement to reduce or eliminate side-loading or binding on one valve member due to loading on another valve members.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

BRIEF DESCRIPTION OF THE DRAWINGS

FIG. 1 is a full cross-sectional view of the multi-channel valve according to the present invention shown in a fully closed position;

FIG. 3A is an exploded assembly view of an actuator assembly of the valve;

FIG. 3B is an assembled view of the actuator assembly of FIG. 3A;

FIG. 4 is an enlarged partial cross-sectional view showing one valve assembly in a fully opening position;

DETAILED DESCRIPTION OF THE PREFERRED EMBODIMENT

Figure 2:
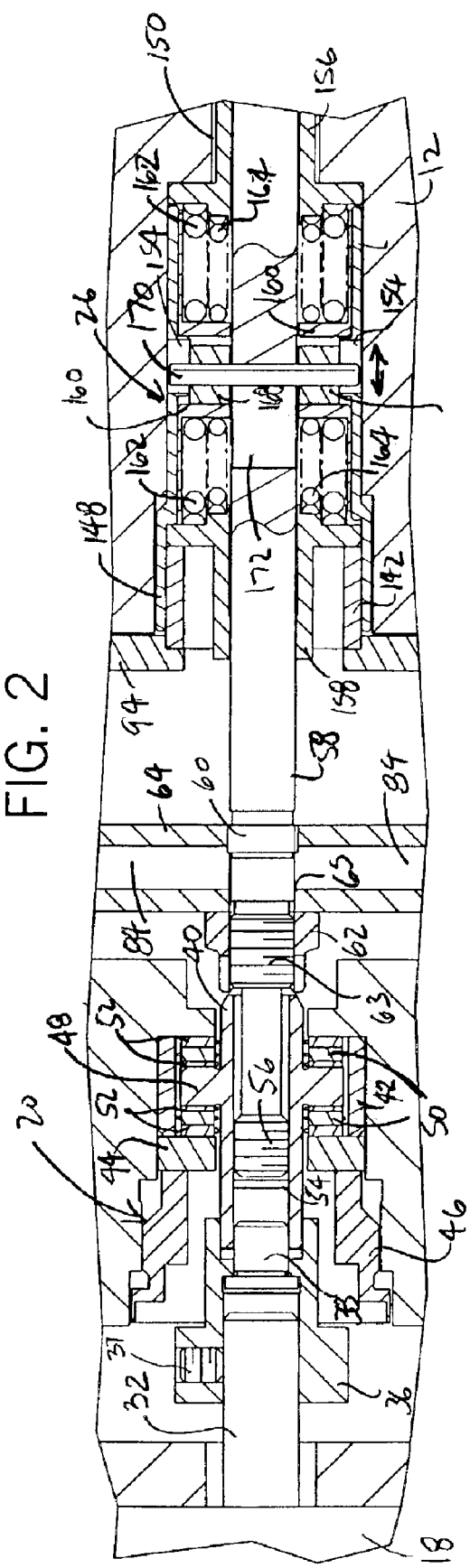
FIG. 2 is a enlarged partial cross-sectional view showing drive and stop cushioning assemblies of the valve.

Referring to FIG. 1, the present invention provides a multi-channel (shown with two channels 96) metering valve 10. Generally, the valve 10 includes a valve housing 12 having an open end 14 to which is connected a motor mount 16. These components and all those described herein are preferably constructed of materials having low weight but high resistance to contaminants as need to withstand the harsh environments common to air and space applications. The housing 12 and motor mount 16 mount or contain the motor 18 and the primary assemblies of the valve 10, including a drive assembly 20, an actuator assembly 22, multiple (in this case two) identical valve assemblies 24 and a stop cushioning assembly 26. FIG. 1 shows the valve assemblies 24 in the fully closed position.

The motor 18 driving the drive assembly 20 is preferably a DC electric motor 22, but could be any other drive means, such as a hydraulic or pneumatic motor. Preferably, the motor 18 includes a position transducer (not shown) providing a position feedback signal, as known in the art, to the master computer/controller (not shown). The front face of the motor 18 is bolted to a first flanged end 28 of the motor mount 16, the second flanged end 30 of which is bolted to the open end 14 of the housing 12 and sealed by an o-ring 31. The motor 18 turns a drive shaft 32, and thereby the rotatable components of the drive assembly 20, about a shaft axis 34.

Referring to FIGS. 1 and 2, in the preferred construction shown in the drawings, the drive shaft 32 mounts a shaft coupler 36 (secured by a set screw 37) which in turn mounts a guide pin 38 keyed to an annular drive nut 40 disposed in the center of the motor mount 16. The drive nut 40 is rotatably disposed inside of a spacer sleeve 42 and the center of a thrust block 44, both of which are held in place by a clamp nut 46 threaded to the inside of the motor mount 16. Operating the motor 18 turns the drive shaft 32, shaft coupler 36 and guide pin 38, either clockwise or counterclockwise, which in turn rotate the drive nut 40. The drive nut 40 has a central flange 48 on each side of which is an assembly of two thrust bearings 50 sandwiched between two thrust washers 52. The outer races of the thrust bearings 50 are fixed by interference to the spacer sleeve 42, and thus to the motor mount 16, while the inner races are free to rotate with the drive nut 40. The drive nut 40 (via flange 48) and the thrust bearings 50 act to transfer (through the actuator assembly 22) to the motor mount 16 forces arising from pressure on the valve assemblies 24 that would otherwise be distributed to the motor 20. This redistribution of the pressure loads promotes accurate and responsive valve positioning and helps prolong the operational life of the motor 18. In addition, the components of the drive assembly 20 (except for the motor 18) are enclosed in the motor mount 16 and isolated from the metered media and other contaminants to ensure low-friction and militate against premature wear and operational failure.

Figure 5:
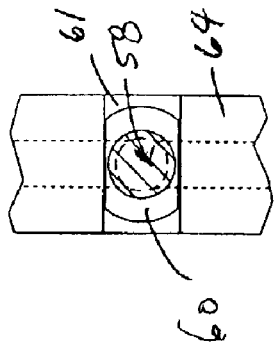
FIG. 5 is a partial cross-sectional view taken along line 5—5 of FIG. 1.
Figure 7:
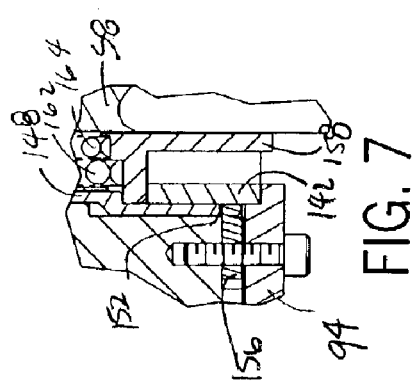
FIG. 7 is a partial cross-sectional view taken along line 7—7 of FIG. 6.
Figure 6:
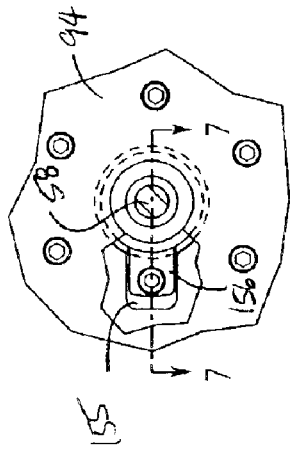
FIG. 6 is a partial cross-sectional view taken along line 6—6 of FIG. 1 with a valve housing end plate shown cut away.

The drive nut 40 has a threaded bore 54 concentric with the shaft axis 34, which engages a threaded end 56 of a main shaft 58 coupling the drive 20, actuator 22 and stop cushioning 26 assemblies. The actuator assembly 22 is fixedly mounted to the main shaft 58 by at an intermediate location by a double "D" key 60 and slot 61 arrangement (as shown in FIGS. 3B and 5) as well as a nut 62 threaded to an intermediate threaded section 63 of the main shaft 58. In particular, the slot 61 is formed in a downstream side of a swivel base 64 intersecting a central opening 66 therethrough through which the main shaft 58 extends. The swivel base 64 is thus disposed essentially perpendicular to the shaft axis 34. In the two channel embodiment described herein, the swivel base 64 is a straight bar, however, its configuration can be changed as needed for valves with three or more channels. For example, the swivel base 64 may be Y-shaped for a three channel valve, cross-shaped for a four channel valve and disc-shaped for a five or more channel valve. In any case, the swivel base 64 will mount two or more (depending on the number of channels) identical movable joints 68 coupling the valve assemblies 24 to the swivel base 64. The movable joints 68 are designed to provide one or more degrees of freedom between the actuator 22 and valve 24 assemblies (as will be described), while maintaining precise positioning control with little play or slop in the direction that the entire actuator assembly 22 translates.

Referring to FIGS. 1 and 3A-3B, in one preferred form each movable joint 68 is made of a clevis member 70 and a slotted nut 72 arrangement. Each clevis 70 has a cylindrical stem 74 at one end and an opposite forked end 76 to define a Y-shaped structure. The prongs of the forked end 76 have outwardly extending ears 78 that are tapered to a middle peak to fit in line contact against the opposing walls of two slots 80 in the nut 72 on opposite sides of a threaded bore 82 therein. The line contact engagement allows the nut 72 to pivot and translate (up and down in the drawings) slightly (until restrained by contact with the clevis 70) with respect to the clevis 70 about and along a nut axis 88. Each clevis 70 mounts to the swivel base 64 at a cylindrical opening 84 extending through peripheral edge surfaces thereof. The clevis stems 74 fit into these openings 84 to free pivot and slide therein. This arrangement thus provides for four degrees of freedom, namely pivoting and sliding of each clevis 70 about an axis 86 perpendicular to the shaft axis 32 as well as translating and pivoting of each nut 72 about axes 88 perpendicular to both the shaft axis 32 and clevis axis 86. The movable joints 68 reduce or eliminate cross-loading between the valve assemblies 24. For example, binding or side loading on one valve assembly from the pressurized media will be isolated from (not transferred through the actuator assembly 22 to) the other valve assembly. While this arrangement provides some degree of flexibility to eliminate cross-loading, the range of movement of the movable joints 68 is limited by interference of the mating clevis 70 and nut 72 components as well as by the connection of the nuts 72 to the valve assemblies 24. Accordingly, the construction of the actuator assembly 22 provides for precise and responsive valve positioning by isolating the loading on each valve assembly using joints with a restrained range of motion.

Referring to FIGS. 1 and 4, the actuator assembly 22 couples to each of the (in this case two) valve assemblies 24, the components of which are preferably made of stainless steel, by engagement of a threaded end 90 of a connecting rod 92 in the threaded bore 82 of the associated nut 72. The connecting rods 92 extend through holes in an end plate 94 bolted to the open end 14 of the housing 12 into separate valve channels 96. The end plate 94 encloses the valve housing 12 and secures seal blocks 98 in the channels 96. The seal blocks 98 have grooves holding two outer seals 100 (preferably o-rings) and two shaft seals 102 (preferably Teflon® cap strip seals), which create a sliding seal with the main shaft 58. The seals 100 and 102 isolate the gaseous or liquid media being metered from the components enclosed in the motor mount 16. The two sets of seals 100 and 102 are mounted on each side of a passageway 103 leading to an interstitial vent (or witness drain) for observance of media leakage during maintenance checks.

The seal block 98 in turn secures a guide tube 104 in the associated channel 96 which abuts an annular seal adapter 106 and a nozzle module 108. The guide tube 104 defines a cylindrical inner passageway 110 and has a transverse opening 112 allowing communication between the inner passageway 110 and the supply inlet passageway 114 (shown in phantom and including the enlarged passage area 115) receiving pressurized media from a supply tank (not shown). It should be noted that the media can be any suitable liquid or gaseous media. When the valve is to be used with scramjet engines, however, the media is a gaseous hydrogen (with silane at ignition). JP-7, available from refining hydrocarbon based liquid, is an example of one common jet fuel formula naturally available as a liquid and can be transformed into a gaseous state suitable for use with the present valve in a scramjet application. Note also that the valve 10 is useable in the harsh operating environment of scramjet engine application in which the media can reach 1000 psia and 1350° F.

The seal adapter 106 also defines an inner passageway 116 aligned with that of the guide tube 104 and mounts an outer seal 118. The nozzle module 108 has two outer seals 120 and defines a venturi passageway 122 having the characteristic narrowed throat 124 and tapered inlet and outlet sections, the outlet defining an outlet port 126 that is isolated from the that of the other channel(s), to which suitable fittings can be mounted to interface with transport lines (not shown). As is understood in the art, the venturi passageway 122 enables the media to reach sonic velocity at the throat 124, which prevents noise at the outlet port from reaching the intake port with relatively small pressure loss between the supply inlet 114 and the outlet port 126. The nozzle module 108 slides into the channel 96 and is threaded to the housing 12 from a back end 128 with a spacer 129 therebetween.

The throat 124 of each venturi passageway 122 through the nozzle module 108 is closed by an elongated contoured head 130 of a pintle 132 extending through inner passageway 110 of the guide tube 104 along a stroke axis 134, essentially parallel to the shaft axis 34. A trailing end 136 of each pintle 132 threads into a threaded socket 136 in an end 138 of the connecting rod 92. The connecting rod end 138 also defines a cylindrical pocket 140 for a spacer sleeve 142 pressing a pintle seal 144 (preferably a cap strip seal) against a flange 146. The pintle seal 144 creates a sliding seal with the inner passageway 110 of the guide tube 104.

Referring now to FIGS. 1 and 2, the final assembly to be described is the stop cushioning assembly 26 mounted in the housing 12 around the main shaft 56. The stop cushioning assembly 26 includes an index sleeve 148 disposed in a central cavity 150 of the housing 12 concentric with the shaft axis 34. The index sleeve 148 has an edge slot 152 at one end and a slots 154 at opposite intermediate wall locations. The index sleeve 148 is clocked to align the edge slot 152 with a radial recess 155 on the open end 14 of the housing 12 extending radial outward from the central cavity 150. An anti-rotation lug 156 is placed in the radial recess 155 and the edge slot 152 and is bolted to the housing 12 to prevent rotation of the index sleeve 148 with respect to the housing 12. The index sleeve 148 is pressed in abutment with the housing 12 by the end plate 94 by pressing a spacer sleeve 156 against a flange of an annular end piece 158 abutting the index sleeve 148. The index sleeve 148 holds two spring cups 160 opening in opposite directions and each containing an inner 162 and an outer 164 coil spring. A second annular flanged end piece 166 and end piece 158 capture the springs 162 and 164 in each cup and preloads them so that the cups abut opposite sides of walls defining the intermediate slots 154 between which is disposed an annular stop ring 168. The stop ring 168 has aligned openings in which an anti-rotation pin 170 is disposed having an intermediate portion disposed through a slot 172 in the main shaft 58 and ends extending beyond the stop ring 168 into the intermediate slots 154 in the index sleeve 148. Note that the main shaft 58 extends beyond the stop cushioning assembly 26 in the central cavity 150, which can open through to the back end 128 so that the main shaft 58 can drive a tandem valve. Otherwise, the central cavity 150 can be plugged (as shown) or formed to have a closed end.

In operation, the motor 18 of the valve 10 is electrically coupled to an electronic control unit (not shown). In the case of a jet or scramjet engine application, the control unit will be an integral or discrete part of a vehicle system computer, which provides input command signals to control the pintle positioning and thus flow of pressurized fuel through the valve 10. According to the command input, the motor 18 will turn the drive nut 40 which will engage the threaded end 56 of the main shaft 58. The anti-rotation pin 170 will prevent the main shaft 58 from rotating by contact with the walls of the slot 172 and thus cause the main shaft 58 to translate. This in turn drives the actuator assembly 22 to translate the moveable components of the valve assemblies 24. In particular, it will move the pintles 132 between a fully open position (as shown in FIG. 1) to a fully closed position (as shown in FIG. 4) in which the pintle head 130 fully seals off the throat 124 of the nozzle venturi. When the venturi passageway 122 is open, pressurized media from a supply tank can enter the supply inlet passageways 114 of the valve 10, perhaps through lines connected to a manifold block (not shown) formed into or mounted to the housing 12, and pass into the valve channels 96, around the pintles 132 (when open), through the venturi passageway 122 and out the outlet ports 126. Varying the location of the pintles 132 along the stroke axes 134 varies the volume of flow through the channels of the valve 10. While the inlet side can be separate or in common, the outlet side of the valve 10 each valve channel 96 will be isolated from the others. The media can then be transported through separate lines or passageways to different zones or combustion chambers of the engine.

As discussed in detail above, the drive assembly 20 is designed to reduce thrust loads realized by the motor 18 and the actuator assembly 22 is designed to eliminate cross-loading on the pintles 132. These features all work to provide nearly perfectly uniform pintle position so that the media leaving each outlet port 126 is nearly identical in rate and volume, thus minimizing to a great extend flow division deviation. Pintle positioning (and thus metering accuracy) is further enhanced by the feedback signal (from the position transducer in the motor 18) provided to the control unit. The control unit can then execute position correcting signals to the valve if the actual position was different than that of the command input.

The stop cushioning assembly 26 provides for non-jamming forward and reverse stops in the event the input signal overdrives the motor 18 in either direction, such as shown in FIG. 2. It does this by allowing the anti-rotation pin 170 to translate in either direction slightly within the slots 154 of the index sleeve 148 so that main shaft 58 can translate slightly further in either direction rather than locking when either end of the slot 172 hits the pin 170. The springs 162 and 164 absorb the energy from the main shaft 58 hitting the pin 170 and return it to the default position after the main shaft 58 position is corrected. Primarily, this prevents the mating threads of the drive nut 40 and the main shaft 58 from locking together. It also reduces damage to or shearing of the anti-rotation pin 170 or main shaft 150 in the event of an error condition.

The present invention thus provides a highly accurate metering valve using a single actuator to drive the valve members controlling flow through the multiple channels of the valves. The actuator assembly drives the valve members uniformly to meter nearly identical volumes of media through all channels. Flow division deviation is further minimized by the movable clevis and nut joints for each valve member which provides a connection with nearly zero play in the direction of translation along shaft axis, while providing some degree of freedom to reduce or eliminate the side-loading or binding on one valve member due to loading on another valve members.

It should be appreciated that merely a preferred embodiment of the invention has been described above. However, many modifications and variations to this preferred embodiment will be apparent to those skilled in the art, which will be within the spirit and scope of the invention. Moreover, the described scramjet engine application is only one of the many uses for the valve of the present invention; it is also possible for the valve construction described herein to be used to meter gas or liquid media in other applications. Therefore, the invention should not be limited to the described embodiment. To ascertain the full scope of the invention, the following claims should be referenced.

I claim:

1. A multi-channel metering valve, comprising:
    a housing defining a first valve channel having a first outlet port and a second valve channel having a second outlet port;
    first and second valve members in the respective first and second valve channels movable along respective first and second stroke axes to open and close off communication to the respective first and second outlet ports;
    an actuator assembly having a first movable joint having a first pivotal member and coupled to the first valve member and a second movable joint having a second pivotal member and coupled to the second valve member; and
    a drive assembly moving the actuator assembly to translate the first and second valve members along the respective first and second stroke axes.

2. The valve of claim 1, wherein the first and second pivotal members each include a clevis member pivotal about a clevis axis essentially coplanar with and perpendicular to the first and second stroke axes.

3. The valve of claim 1, wherein the first and second valve members are pintles having a contoured head.

4. The valve of claim 3, wherein the drive assembly provides a rotational input to the actuator assembly to impart translation to the first and second pintles.

5. The valve of claim 4, further including a main shaft connected to the actuator assembly, the main shaft being held against rotation and threaded end and wherein the drive assembly includes a drive nut engaging the threaded end of the main shaft to translate the main shaft as the drive nut is rotated.

6. The valve of claim 5, wherein the main shaft has a slot through which extends an anti-rotation pin.

7. The valve of claim 6, further including a stop cushioning assembly coupled to the main shaft allowing translation of the anti-rotation pin parallel to the first and second stroke axes.

8. The valve of claim 6, further including a motor having a rotating shaft coupled to the drive assembly.

9. The valve of claim 3, wherein the actuator assembly includes a swivel base and wherein the first and second movable joints are pivotal with respect to the swivel base.

10. The valve of claim 9, wherein the first and second movable joints are translatable with respect to the swivel base.

11. The valve of claim 9, wherein the swivel base extends essentially perpendicular to the first and second stroke axes and wherein the first and second movable joints are translatable in a direction essentially perpendicular to the first and second stroke axes.

12. The valve of claim 11, wherein the first and second pivotable members each include a clevis having a stem at one end and an opposite forked end.

13. The valve of claim 12, wherein the first and second pivotable members each further include a nut mounted to the forked end of the clevis and having a threaded bore for coupling to the respective first and second pintles.

14. The valve of claim 13, wherein each nut is mounted to be translatable and pivotal with respect to its associated clevis.

15. The valve of claim 14, wherein the swivel base has a peripheral edge defining at least two opposite facing surfaces parallel to the first and second stroke axes through which extend first and second openings receiving the clevis stem of the respective first and second movable joints.

16. The valve of claim 15, wherein each of the first and second pintles includes a drive rod coupled to the threaded bore of the associated nut.

17. The valve of claim 16, wherein the swivel base is a straight bar.

18. The valve of claim 1, further including an anti-rotated main shaft coupling the drive and actuator assemblies and driven by the drive assembly to translate essentially parallel to the first and second stroke axes.

19. The valve of claim 18, wherein the shaft has a slot receiving an anti-rotation pin.

20. The valve of claim 18, further including a stop cushioning assembly coupled to the main shaft allowing translation of the anti-rotation pin parallel to the first and second stroke axes.

21. The valve of claim 18, wherein the actuator assembly further includes a swivel base mounting the first and second movable joints and having a central opening extending parallel to the first and second stroke axes to which the shaft is mounted.

22. The valve of claim 3, wherein the first and second valve channels each include a nozzle passageway defining a venturi opening having a narrowed throat that can be sealed by the heads of the respective first and second pintles.

23. The valve of claim 1, wherein the first outlet is isolated from the second outlet.

24. The valve of claim 1, wherein each of the first and second moveable joints provides at least one degree of freedom between the drive assembly and the respective first and second valve members.

25. The valve of claim 24, wherein each of the first and second movable joints provides four degrees of freedom between the drive assembly and the respective first and second valve members, including translation and rotation about each of two separate additional axes.

26. The valve of claim 25, wherein the two additional axes lie in a plane perpendicular to the a plane containing the first and second stroke axes.

27. A multi-channel metering valve, comprising:
   a valve housing defining at least two valve channels each having a venturi passageway leading to an isolated outlet port;
   at least two pintles disposed in the at least two valve channels each extending along a stroke axis, the first and second pintles each having a contoured head sized to close off a throat of the venturi passageway;
   a single actuator assembly having a swivel base to which are coupled at least two clevis members to be independently movable with respect to the swivel base, each clevis member being coupled to one of the at least two pintles; and
   a drive assembly moving the actuator assembly to translate the at least two pintles essentially the same distance along its associated stroke axis.

28. The valve of claim 27, wherein the swivel base extends essentially perpendicular to the stroke axes and is translatable in a direction essentially perpendicular to each stroke axis and wherein each clevis is pivotal with respect to the swivel base about a clevis axis essentially coplanar with and perpendicular to the stroke axes.

29. The valve of claim 28, wherein each clevis can slide with respect to the swivel base along the associated clevis axis.

30. The valve of claim 29, wherein each clevis has a stem at one end disposed along the associated clevis axis and an opposite forked end.

31. The valve of claim 30, wherein the actuator assembly includes at least two nuts each mounted to the forked end of one of the at least two clevis members and having a threaded bore for coupling to one of the at least two pintles.

32. The valve of claim 31, wherein each nut is mounted to be translatable and pivotal with respect to its associated clevis.

33. The valve of claim 32, wherein the swivel base has a peripheral edge defining at least two opposite facing surfaces parallel to the stroke axes through each of which extend an opening receiving the stem of the associated clevis.

34. The valve of claim 33, wherein the drive assembly includes a rotatable drive nut and further including a main shaft fixedly coupled to the swivel base and having an end engaged by the drive nut.

35. The valve of claim 34, wherein the shaft is anti-rotated by a pin and slot connection.

36. The valve of claim 35, further including a stop cushioning assembly mounted to the valve housing permitting restrained translation of an anti-rotation pin of the pin and slot connection in a direction parallel to the stroke axes.

37. The valve of claim 27, further including an electric motor.

* * * * *

UNITED STATES PATENT AND TRADEMARK OFFICE
CERTIFICATE OF CORRECTION

PATENT NO.        : 7,240,695 B2                                            Page 1 of 1
APPLICATION NO. : 10/366293
DATED             : July 10, 2007
INVENTOR(S)       : Harvey B. Jansen It is certified that error appears in the above-identified patent and that said Letters Patent is hereby corrected as shown below:

Col. 8, claim 5, line 21 "and threaded end and" should read --and having a threaded end and--.

Col. 8, claim 15, line 57 "second openings receiving" should read --second openings each receiving--.

Signed and Sealed this

Sixth Day of November, 2007

JON W. DUDAS
*Director of the United States Patent and Trademark Office*